April 16, 1940.  N. A. CHRISTENSEN  2,197,068
BRAKE MECHANISM
Original Filed April 9, 1932   3 Sheets-Sheet 3

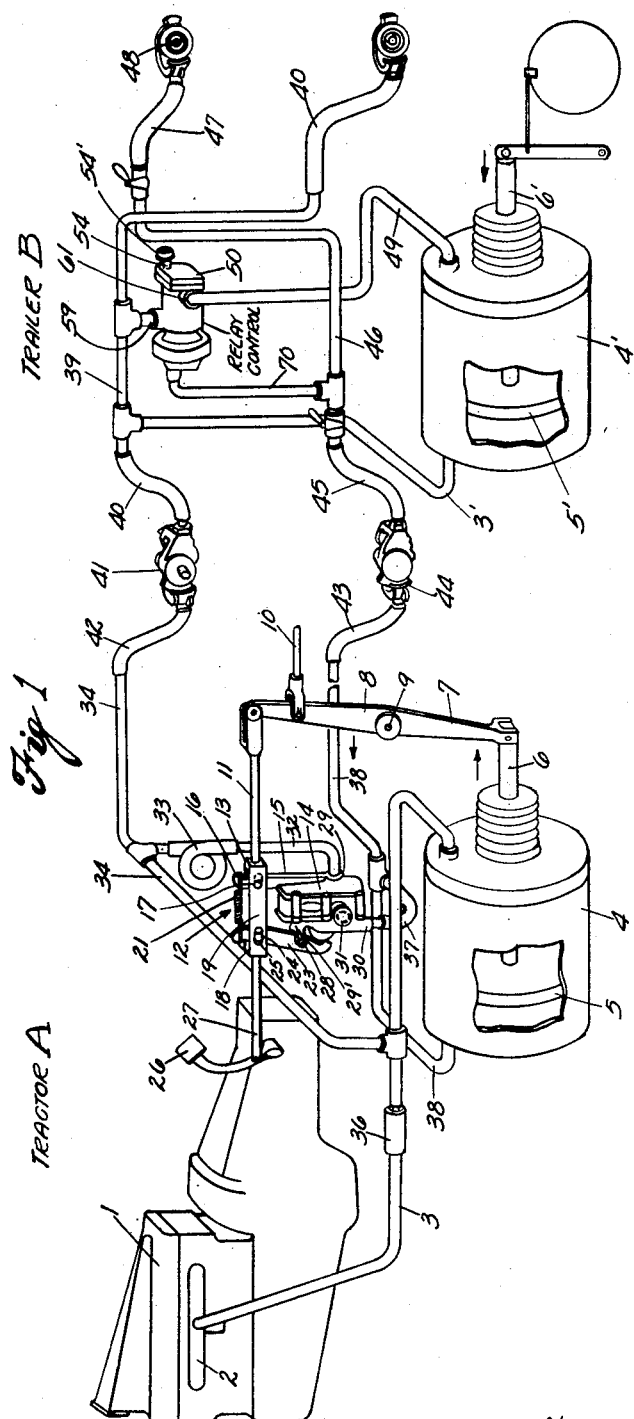

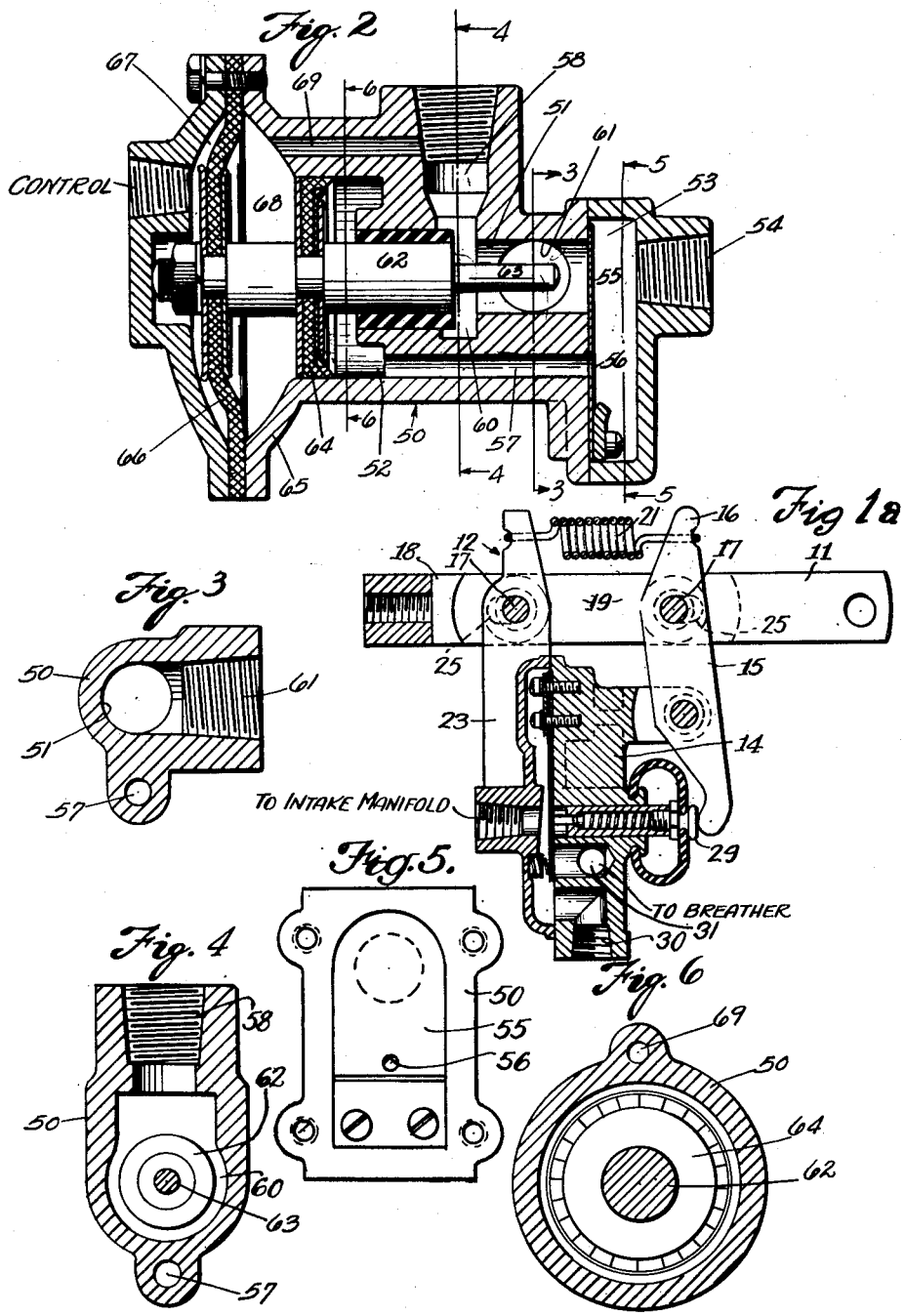

INVENTOR.
NIELS A. CHRISTENSEN
BY
ATTORNEY.

Patented Apr. 16, 1940

2,197,068

UNITED STATES PATENT OFFICE 2,197,068

BRAKE MECHANISM

Niels Anton Christensen, South Euclid, Ohio

Original application April 9, 1932, Serial No. 604,203. Divided and this application March 10, 1938, Serial No. 194,995

4 Claims. (Cl. 188—3)

This application is a division of my co-pending application, Serial No. 604,203 filed April 9, 1932.

An important object of the invention is to improve, simplify and to co-relate the braking effort of a truck and trailer combination by the provision of a control unit on the trailer, which is subjected to braking pressures on both the truck and trailer units to obtain the proper braking action of the brake mechanism of both the truck and trailer.

Another object of the invention is to provide a compensating control valve for the trailer.

Other objects and advantages of the invention will appear during the course of the following description.

Figure 7:
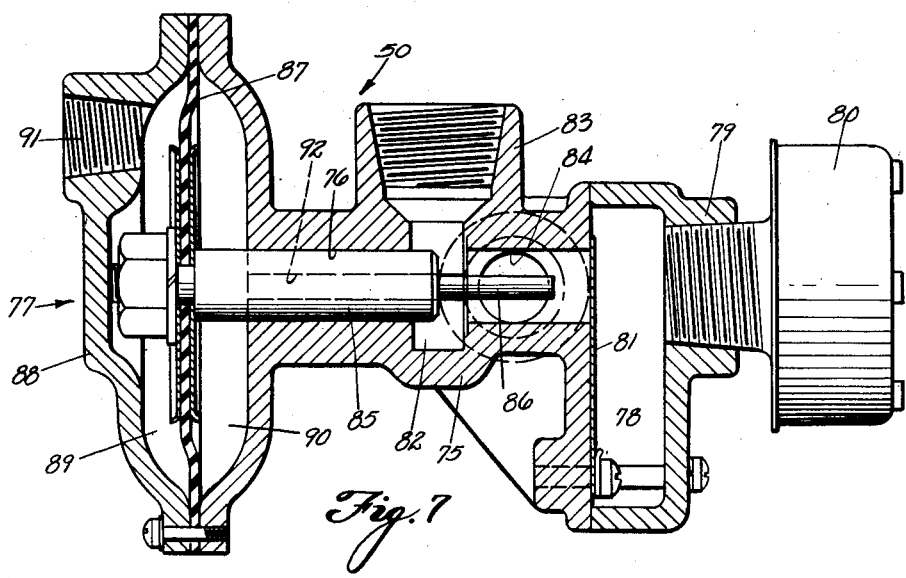
Figure 8:
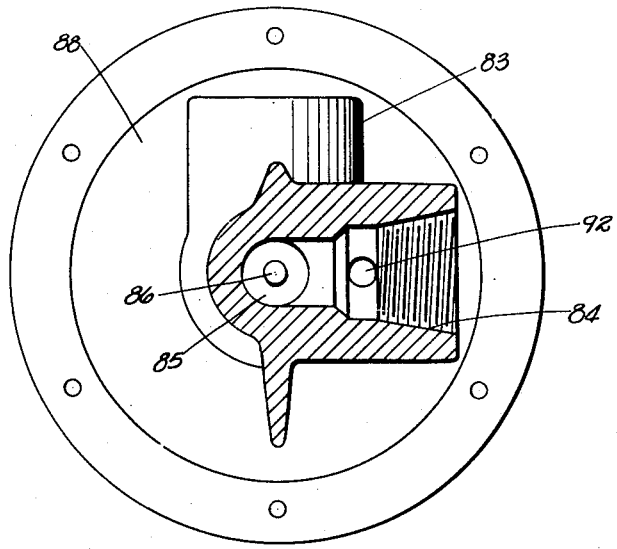

In the accompanying drawings forming a part of the application and wherein like numerals are employed to designate like parts throughout the several views, Fig. 1 is a diagrammatic view of the improved control system for a truck and trailer combination, Fig. 1a is a vertical section through the foot control valve, Fig. 2 is an enlarged longitudinal section of one form of control valve employed on the trailer unit, Fig. 3 is a transverse section of the same taken on the line 3—3 of Fig. 2, Fig. 4 is a transverse section taken through the same on the line 4—4 of Fig. 2, Fig. 5 is a transverse section taken on the line 5—5 of Fig. 2, Fig. 6 is another transverse section taken on the line 6—6 of Fig. 2, Fig. 7 is a longitudinal section taken through another form of the control valve, Fig. 8 is a transverse section taken through the same on the line 8—8 of Fig. 7.

Referring now to the drawings in detail wherein for the purposes of illustration, the invention is shown in one form of its application, the letter A designates a brake installation as applied to a truck or hauling vehicle and the letter B designates the part of the brake system applied to the trailer vehicle hauled by the truck. The numeral 1 indicates an internal combustion engine carried by the truck having a throttle controlled intake manifold 2 from which suction or a partial vacuum is derived from the operation of the engine. A pipe 3 is connected to the intake manifold and to the rear end of a brake or power cylinder 4 connected to the truck chassis. Both ends of this cylinder in the present illustration are closed, so that a partial vacuum may be created in both ends of the cylinder on opposite sides of its piston 5, whereby this piston may be normally submerged in a partial vacuum when the brakes are in a release position. This type of system is usually designated "vacuum suspended" due to the fact that the power piston in the brake cylinder is normally submerged in a vacuum when the brakes are in release position.

The piston 5 has its rod 6 extending through the rear end of the cylinder 4, and is connected to the lower end 7 of a lever 8 fulcrumed as at 9 on the truck. At the point adjacent its upper end, the lever 8 has pivotally connected thereto a brake rod 10 which connects to the brake rigging of any desired type of brake mechanism illustrated.

The upper end of lever 8 is pivotally connected with a brake rod section 11 to which is connected a lost motion device 12, consisting of two relatively movable yoke sections 13 and 18. A main control valve 14 operated by the brake pedal of the truck is suspended in the brake rodding, by means of the valve casing having a vertical arm 15 supported upon a pin 17 which extends through the two arms of yoke 13.

The other yoke section 18 of the lost motion device has its two arms arranged in spaced parallel relationship to slide along the inner surfaces of the arms 19 of the yoke 13 and is connected by brake rod section 27 to a brake pedal 26. Each arm of the yoke 18 adjacent one end is provided with an elongated slot to slidably receive the pin 17 and permit movement of the yoke 18 relative to yoke 13 for a predetermined distance without moving the latter. The upper end of extension 15 of the valve casing extends above the yokes for connection with one end of a tension coil spring 21, the other end of the spring being hooked about the upper end 22 of the valve operating lever 23, which is pivotally connected by a pin 24 to the yoke 18, for normally urging the valve actuating lever 23 to brake release position. This pin 24 extends through slots 25 provided in the ends of arms 19 of yoke 13 and the spring 21 normally bottoms the pin 24 in the ends of the slots 25 adjacent the pin 17, so that when the foot pedal 26 is depressed, the pin 24 will cause the valve actuating lever 23 to fulcrum on pin 28 which is carried by an integral forked extension 29' of the valve casing 14, without exerting any pull on the brake rod 11, due to the idle movement of the pin 24 in the slots 25. When, however, the pin 24 reaches the end of its travel and bottoms in the ends of slots 25 nearest the brake pedal, no further lost motion can occur, so that further depression of the brake pedal moves the rod section 11 and therefore pulls on the brakes manually without stressing the control valve parts.

The control valve 14 is provided with a low pressure or vacuum port 29, a brake pressure port 30 and a high pressure or atmospheric port 31 which are controlled in accordance with movements of the brake pedal and brake rigging by a valve mechanism inside of the control valve 14, as fully described and illustrated in my co-pending application Serial No. 604,203. A branch pipe 32 having a flexible section 33 therein connects the port 29 with a low pressure or vacuum pipe 34, the rear end of which terminates at the rear end of the truck vehicle and the forward end of which is connected to a low pressure or vacuum pipe 3 having a check valve 36 therein and which is connected to the intake manifold 2. The pipe 3 extends to connect to the rear end of the power cylinder 4. The brake port of the control valve is connected by a flexible branch 37 to a pipe 38 which leads to the forward end of the brake cylinder 4, while its opposite end extends to the rear end of the truck as illustrated.

In this set up, the power cylinder 4 is vacuum suspended due to the fact that ports 29 and 30 of the control valve, normally communicate when the brake is in release position, and when the brake pedal 26 operates control valve lever 23, the atmospheric port 31 is brought into communication with port 30, while port 29 is cut off, so that air at atmospheric pressure is dumped into the forward end of the brake cylinder 4, by the control line 38 during a brake application. As specified in my aforesaid co-pending application, the control valve 14 may be converted to operate an air suspended tractor system by interchanging the connections to ports 29 and 31, placing the air breather in port 29 and connecting pipe 32 with port 31, so that normally, in brake release position the forward end of power cylinder 4 is in communication with the atmosphere. In such a hookup, the vacuum pipe connection 31 to the rear end of the power cylinder 4 is disconnected so as to open the rear end of the power cylinder 4 to atmospheric pressure to normally submerge the piston 5 in atmospheric pressure.

In Fig. 1 the apparatus has been illustrated hooked up for simultaneous power application of the brakes on both truck and trailer. In the present illustration, the trailer brake cylinder 4' is illustrated as being of the vacuum suspended type with its forward end connected with a low pressure or vacuum pipe 3' connected to a main vacuum pipe 39 extending throughout the length of the trailer to be provided at opposite ends with flexible hoses 40. The hose 40 at the forward end of the trailer is connected by a suitable coupling device 41 with a flexible hose 42 connected to the rear end of low pressure line 34 of the tractor. A coupling hose 43 connects the control pipe 38 with a coupling device 44, which in turn is connected by a flexible hose 45 to a control line 46 on the trailer. These couplings 41 and 44 may be of any desired type, but are preferably of the kind disclosed in my aforesaid co-pending application in which all coupling ends of the couplings 41 and 44 are provided with check valves with the exception of the coupling and associated with hose 45, so that upon separation of the truck and trailer, the control line 46 of the trailer is left open to the atmosphere for causing an automatic application of the brakes on the trailer. The control line 46 terminates in a hose 47 and plain coupling device 48 at the rear end of the trailer so that additional trailer units may be included in the vehicle train. The brake cylinder 4' is provided with a piston 5' having a piston stem 6' extending through one end of the cylinder to be connected in any suitable manner to the brake rigging of the trailer. The end of the brake cylinder opposite that end to which pipe 3' is connected, is connected with a pipe 49 which is connected to a control valve 50.

This control valve may assume either the form shown in Fig. 2 or that shown in Fig. 7 so as to control the trailer brakes in accordance with the variations of pressure in the braking system of both the tractor and trailer.

The relay control valve shown in Fig. 2 takes the form of a casing having a longitudinal bore 51. One end of the bore enters a chamber 52 intermediate the ends of the casing and the other end enters a chamber 53 which communicates with the atmosphere, in the present hook up, by means of a port 54 having an air filter 54'. A stiff flat spring valve 55 in chamber 53 normally engages the end of the casing in air tight relation to close off the bore 51 from chamber 53. This valve 55 has an opening 56 therein in registration with a passage 57 extending lengthwise of the casing to enter the chamber 52 and thereby maintain chambers 52 and 53 in constant communication. A lateral port 58 is connected by a pipe 59 to the low pressure line 39 and communicates with the bore 51 intermediate its ends by means of a chamber 60. Between this chamber 60 and the valve 55, the bore 51 is provided with another lateral port 61 to which the brake pipe 49 is connected to transmit the pressure existing in chamber 51 to the brake cylinder 4'.

A combined valve and piston 62 is adapted to operate in the bore and has one end provided with a reduced extension 63 of a length approximately equal to the length of the portion of the bore 51 defined between chambers 60 and 53, so as to contact the valve 55 and begin opening it, as the piston 62 enters the portion of the bore to the right of the chamber 60, approximately when the enlarged portion of the piston begins to close off the bore 51 from the chamber 60. When the piston 62 enters the bore 51 to cut off communication between the low pressure port 58 and the brake cylinder port 61, a chamber is defined between the piston 62 and the spring 55 whereby the pressure therein is exercised against the end of the piston 62. This pressure in the present illustration constitutes the brake cylinder pressure which is exercised against the end of piston 62.

Operating in chamber 52 is an enlarged piston head 64 secured to the piston 62 to move therewith. This piston end of the casing is enlarged as at 65 to provide a diaphragm chamber in which diaphragm 66 is secured to the piston 62 in spaced relation to piston 64 to divide the chamber into a forward control chamber 67 and a rear chamber 68. A port 69 extending longitudinally of the casing communicates chamber 68 with the low pressure port 58. The chamber 67 is connected to a pipe 70 which connects to the control line 46 so that whatever pressure exists in the control line 38 of the tractor, as set up by the main control valve 14, is exercised in the control chamber 67 of the relay control valve 50.

Fig. 2 shows the normal brake release position of the control valve 50 when hooked up in a vacuum suspended system for truck and trailer.

Since port 58 is connected with the low pressure or vacuum line 39, low pressure or vacuum exists in chambers 68 and 60 as well as in the pipe 49 leading to the rear end of the trailer brake cylinder 4'. At the same time, chamber 52 is constantly exposed to the higher atmospheric pressure existing in chamber 53, for returning the valve to brake release position.

When the tractor brakes are operated, air is admitted by the main control valve 14 into pipe line 38 which moves the piston 5 to the right of Fig. 1, thereby applying the brakes on the tractor. At the same time, this increase in air pressure is conveyed by pipe 70 on the trailer to the control chamber 67 to move the diaphragm 66 to the right of Fig. 2. This causes the piston structure 64 and 62 to move to the right of the figure thereby closing the portion of the bore 51 in which the brake port 61 is positioned and rendering the face of piston 62 subject to the pressure existing in that chamber. This movement of the piston cuts off the low pressure from port 58 into the bore 51, and upon slight further movement of the piston 62 to the right, the air valve 55 is forced from its seat thereby admitting air from the atmosphere into the brake port 61 and thence through pipe 49 into the rear end of the trailer brake cylinder 4' causing its piston 5' to move to the left of Fig. 1, thereby applying the brakes of the trailer. Admission of the higher pressure into the bore 51 exerts a pressure upon piston 62 tending to move the piston to the left of Fig. 2 against the air pressure in chamber 67, so long as the brake pedal 26 of the tractor vehicle is not depressed further. This tendency together with the influence of atmospheric pressure on the piston 64 moves the piston 62 slightly to the left of Fig. 2 without completely removing it from the portion of the bore 51 defined between the brake port 61 and the chamber 60 so that the relay valve is held in the same lapped position the main control valve is held in by the brake pedal cooperating with the truck brake rigging to retain the main control valve in lapped position. Upon release of pressure upon the brake pedal of the tractor, the main control valve is restored to its normal position in which lower pressure is again set up in the control line 38 and trailer branch pipe 70 thereby moving the diaphragm 66 together with the piston structure to the left of Fig. 2 to restore the relay control valve 50 to brake release position. The restoration of the relay control valve to its normal position is assured by the atmospheric pressure upon piston 64 in the direction of the lower pressure existing in chamber 68. When the piston 62 moves out of the bore 51 its face is then subjected to the lower pressure entering port 58.

In the form of relay control valve shown in Figs. 7 and 8, a greater compensating action is obtained by reason of having one side of the diaphragm connected at all times to the brake cylinder port of the valve. This valve comprises a casing 75 having a longitudinal bore 76 extending from an enlarged end 77 at one end to a chamber 78 at the opposite end. This chamber 78 is provided with a port 79, which when the valve is employed in a vacuum suspended system on the trailer, has connected thereto an air filter 80 which opens the chamber 78 to atmospheric pressure. A flat stiff spring valve 81 is mounted in chamber 78 and adapted to normally close the end of the bore 76 entering this chamber, so as to normally seal off the bore from atmospheric pressure. Intermediate of its ends, the bore 76 is provided with an enlarged chamber 82 communicating with a lateral port 83 to which is connected suction pipe 39. Between this chamber 82 and the valve 81, the bore is provided with a lateral brake port 84 which is connected to pipe 49 leading to the trailer brake cylinder 4'.

A piston 85 is slidably mounted in the bore 76 with a sliding fit and is provided with a reduced extension 86 adapted to unseat valve 81 after the piston 85 enters that portion of the bore 76 having the brake port 84 therein. When in this position, it will be apparent that piston 85 cuts off communication between the low pressure port 83 and the brake cylinder port 84 and subjects the end of piston 85 to atmospheric pressure from chamber 78.

The other end of the piston 85 has secured thereto a diaphragm 87 operating in an enlarged compartment 88 and dividing the same into a control chamber 89 and a compensating chamber 90. The chamber 89 is provided with a port 91 which is adapted to be connected to the control line 70 of the trailer and 38 of the truck. The chamber 90 is connected at all times to the brake port 84 by means of a longitudinally extending passage 92, best seen in Fig. 8.

In a vacuum suspended installation of the trailer, it will be apparent that vacuum exists in both the chambers 89 and 90, due to the piston 85 normally permitting communication between the brake cylinder port 84 and the low pressure port 83. When the tractor brakes are operated by reason of admitting air into control line 38, the air pressure on diaphragm 87 moves the piston 85 to the right of the figure, first cutting off port 83 from the brake cylinder port 84 and then subsequently opening the air valve 81 to admit air into the brake cylinder port and then to the trailer brake chamber, via pipe 49.

It is to be understood that various changes in the relationship and size of the various parts of the valve and piston may be resorted to without departing from the scope of the appended claims, and for further details, reference may be had to my aforesaid copending application.

I claim:

1. The combination with a truck and trailer, each provided with a servo-motor brake, a source of suction, a control valve on the truck for controlling the truck brake, an automatic valve on the trailer for controlling the trailer brake and including a casing having a pressure responsive member, high and low pressure ports and a brake cylinder port connected to the servo-motor brake on the trailer, valve means operated by said pressure responsive member and adapted to connect the brake port with said high and low pressure ports depending upon the position of said pressure responsive member, and said pressure responsive member being at all times subjected on one side to the pressure existing in the brake port in all positions of said valve.

2. The combination with a truck and trailer, each provided with a servo-motor brake, a source of suction, a control valve on the truck for controlling the truck brake, an automatic valve on the trailer for controlling the trailer brake and including a casing having a diaphragm compartment at one end thereof, such casing having high and low pressure ports and a brake cylinder port connected to the trailer servo-motor brake, a diaphragm in said casing dividing said compartment into separate chambers, valve means in said casing adapted to connect the brake port with said high or low pressure ports depending upon the position of said diaphragm, said casing having a passage connected at all times to one of said ports and to one of said chambers on one side of the diaphragm, and the other chamber being connected to the control valve on the truck.

3. In combination with a truck and trailer, each provided with a servo-motor brake of the fluid pressure vacuum operated type, a source of vacuum, a main control valve on the truck, means including said valve for controlling the servo-motor brake on the truck, a relay valve on the trailer directly connected to said main control valve and means including said relay valve for controlling the servo-motor brake on the trailer, said relay valve comprising a casing provided with valve ports connected to the servo-motor brake on the trailer, to atmosphere and to said source of vacuum, respectively, valve means in said casing adapted to cooperate with said ports, and pressure responsive means for actuating said valve means in accordance with the relative value of three pressures, of which, one corresponds to the adjustment of said main control valve, another to the pressure in the valve port connected to the trailer servo-motor, and another to the pressure of the source of vacuum.

4. In combination with a truck and trailer, each provided with a servo-motor brake of the fluid pressure vacuum operated type, a source of vacuum, a main control valve on the truck, means including said valve for controlling the servo-motor brake on the truck, a relay valve on the trailer, a control line for directly connecting said relay valve to said main control valve, means including said relay valve and a line connecting the same to the servo-motor brake on the trailer for controlling said trailer brake, said relay valve comprising a casing provided with valve ports connected to the servo-motor brake on the trailer, to atmosphere and to said source of vacuum, respectively, valve means in said casing adapted to cooperate with said ports, and pressure responsive means for positioning said valve member to interconnect said port connected to the servo-motor on the trailer alternately with either of said other ports in accordance with the relative values of three pressures, of which one corresponds to the pressure in the control line from the main control valve to the relay valve, another to the pressure in the line connecting the relay valve to the servo-motor brake on the trailer, and another to the pressure of said source of vacuum.

NIELS A. CHRISTENSEN.